(12) United States Patent
Wang et al.

(10) Patent No.: US 11,196,236 B2
(45) Date of Patent: Dec. 7, 2021

(54) CLIMBING ROBOT TRAVELING ALONG OVERHEAD LINE

(71) Applicant: Qingdao Sharing Intelligent Manufacturing Co., Ltd, Qingdao (CN)

(72) Inventors: Jidai Wang, Qingdao (CN); Aiqin Sun, Qingdao (CN); Zhiwei Wang, Qingdao (CN); Junying Wei, Qingdao (CN); Enpeng Fu, Qingdao (CN); Muxin Hao, Qingdao (CN); Maoxuan Liang, Qingdao (CN); Shuai Guo, Qingdao (CN)

(73) Assignee: QINGDAO SHARING INTELLIGENT MANUFACTURING CO., LTD, Qingdao (CN)

( * ) Notice: Subject to any disclaimer, the term of this patent is extended or adjusted under 35 U.S.C. 154(b) by 205 days.

(21) Appl. No.: 16/483,836

(22) PCT Filed: Dec. 25, 2018

(86) PCT No.: PCT/CN2018/123661
§ 371 (c)(1),
(2) Date: Aug. 6, 2019

(87) PCT Pub. No.: WO2020/098090
PCT Pub. Date: May 22, 2020

(65) Prior Publication Data
US 2021/0091544 A1 Mar. 25, 2021

(30) Foreign Application Priority Data
Nov. 15, 2018 (CN) .......................... 201811357332.X

(51) Int. Cl.
*H02G 1/02* (2006.01)
*B25J 5/02* (2006.01)
*B25J 19/02* (2006.01)

(52) U.S. Cl.
CPC .................. *H02G 1/02* (2013.01); *B25J 5/02* (2013.01); *B25J 19/023* (2013.01)

(58) Field of Classification Search
CPC ...................................................... H02G 1/02
See application file for complete search history.

(56) References Cited

U.S. PATENT DOCUMENTS

| 2006/0114122 A1* | 6/2006 | Jones | H02G 1/02 |
| | | | 340/870.07 |
| 2014/0208976 A1* | 7/2014 | Jung | B61B 3/02 |
| | | | 104/112 |

(Continued)

FOREIGN PATENT DOCUMENTS

| CN | 101771246 A | 7/2010 |
| CN | 101859990 A | 10/2010 |

(Continued)

OTHER PUBLICATIONS

International Search Report issued in corresponding International Application No. PCT/CN2018/123661; dated Jul. 25, 2019, State Intellectual Property Office of the P.R. China, Beijing, China, 8 pgs.

(Continued)

*Primary Examiner* — Hyun D Park
(74) *Attorney, Agent, or Firm* — Hauptman Ham, LLP

(57) ABSTRACT

A climbing robot traveling along an overhead line including a support structure, the support structure includes a controller, and three cantilevers, i.e., a front cantilever, a middle cantilever and a rear cantilever are mounted at a side of the support structure. Three cantilevers are connected with the support structure through a cantilever base, the front and rear cantilevers are located at both ends of the support structure and include a travel driving mechanism at the top, an opening mechanism, a flexible rotating mechanism and a clamping mechanism in the middle, and a lifting mechanism at the bottom, and the middle cantilever includes a travel driving mechanism at the top, an opening mechanism and a flexible rotating mechanism in the middle, a lifting mechanism at the bottom, and a charging mechanism at a front side of the middle cantilever.

6 Claims, 7 Drawing Sheets

(56) References Cited

U.S. PATENT DOCUMENTS

2015/0204480 A1* 7/2015 Lorimer ................. F16M 13/02
                                                           700/245
2017/0117690 A1* 4/2017 Huang .................... B61B 12/02
2019/0285557 A1* 9/2019 Pouliot ................... H02G 1/02

FOREIGN PATENT DOCUMENTS

CN        102946072 A    2/2013
WO      2020098090 A1    5/2020

OTHER PUBLICATIONS

Written Opinion issued in corresponding International Application No. No. PCT/CN2018/123661; dated Jul. 26, 2019, State Intellectual Property Office of the P.R. China, Beijing, China, 9 pgs.

Office Action issue in corresponding Chinese Application No. 201811357332.X; dated Apr. 1, 2019; 14 pgs.

First Search Report issues in corresponding Chinese Application No. 201811357332.X; dated Mar. 27, 2019; 5pgs.

Notice of Grant issue in corresponding Chinese Application No. 201811357332.X; dated Apr. 22, 2019; 3pgs.

* cited by examiner

CLIMBING ROBOT TRAVELING ALONG OVERHEAD LINE

RELATED APPLICATIONS

The present application is a National Phase of International Application Number PCT/CN2018/123661, filed Dec. 25, 2018, which claims priority to Chinese Patent Application No. 201811357332.X, filed Nov. 15, 2018.

TECHNICAL FIELD

The present disclosure belongs to the technical field of power patrol device, and in particular to a climbing robot traveling along an overhead line.

BACKGROUND

It is required to perform regular maintenance for high-voltage transmission lines to ensure safe and stable operations of the high-voltage transmission lines. Patrol inspection of the high-voltage transmission lines is quite necessary for protecting safety of power grids. Since high-voltage transmission lines are widely distributed and geographical environments of some areas are complex, a manual inspection manner is no longer applicable due to a large labour intensity and a low patrol accuracy. Therefore, a new patrol manner is to be sought. The development of mobile robot technology provides a new technology platform for the patrol of overhead high-voltage transmission lines.

At present, patrol robots under research all need to cross obstacles regardless of travelling along an overhead line or a wire. In this case, the patrol efficiency of the robot is greatly affected. Further, a potential safety hazard also exists in the robot itself. Compared with a robot traveling along a wire, a robot traveling along an overhead line can "look down from a height", thereby having a large field of view for a patrol line and leading to a good patrol effect. However, a strain tower head of the overhead line is complex in structure and difficult to cross for the robot, so that practicability of the robot is greatly restricted.

SUMMARY

An object of the present disclosure is to provide a climbing robot traveling along an overhead line and achieving automatic stride over an obstacle.

To achieve the above object, the following technical solution is adopted in the present disclosure.

A climbing robot traveling along an overhead line includes a support structure mounted with a patrol device.

The climbing robot traveling along an overhead line further includes:

a cantilever base connected to a side of the support structure, and a front cantilever, a middle cantilever and a rear cantilever sequentially mounted on the cantilever base along a front-rear direction.

The front cantilever and the rear cantilever are of a same structure; the front cantilever or the rear cantilever includes a first driving wheel, a first travel driving mechanism, a first opening mechanism, a clamping mechanism, a first flexible rotating mechanism and a first lifting mechanism.

The first travel driving mechanism is connected with the first driving wheel and drives the first driving wheel to rotate.

The bottom of the first travel driving mechanism is mounted on the first opening mechanism used to drive the first driving wheel and the first travel driving mechanism to move along a left-right direction at the same time so as to realize opening and closing actions of the first driving wheel.

The clamping mechanism is located below the first driving wheel and configured to limit the overhead line to be within a wheel groove of the first driving wheel.

The clamping mechanism is configured with a tension spring for automatically returning the clamping mechanism deviating from under the first driving wheel.

The first flexible rotating mechanism is located below the first opening mechanism and connected with the first opening mechanism. The first flexible rotating mechanism is configured to drive the first opening mechanism to rotate at a particular angle within a horizontal direction.

The first lifting mechanism is located below the first flexible rotating mechanism and used to drive the first driving wheel, the first travel driving mechanism, the first opening mechanism, the clamping mechanism and the first flexible rotating mechanism to perform ascending and descending actions synchronously.

The middle cantilever includes a second driving wheel, a second travel driving mechanism, a second opening mechanism, a second flexible rotating mechanism and a second lifting mechanism. The second travel driving mechanism is connected with the second driving wheel and drives the second driving wheel to rotate.

The bottom of the second travel driving mechanism is mounted on the second opening mechanism used to drive the second driving wheel and the second travel driving mechanism to move along a left-right direction at the same time so as to realize opening and closing actions of the second driving wheel.

The second flexible rotating mechanism is located below the second opening mechanism and connected with the second opening mechanism. The second flexible rotating mechanism is configured to drive the second opening mechanism to rotate at a particular angle within a horizontal direction.

The second lifting mechanism is located below the second flexible rotating mechanism and used to drive the second driving wheel, the second travel driving mechanism, the second opening mechanism and the second flexible rotating mechanism to perform ascending and descending actions synchronously.

A controller is disposed in the support structure, where the controller is connected with the first travel driving mechanism, the second travel driving mechanism, the first opening mechanism, the second opening mechanism, the first lifting mechanism and the second lifting mechanism respectively.

Preferably, the first travel driving mechanism and the second travel driving mechanism are of a same structure.

The first travel driving mechanism/the second travel driving mechanism includes a driving motor, a shaft sleeve and a motor base.

The driving motor is connected with the first driving wheel/the second driving wheel through the shaft sleeve, and mounted on the motor base.

The motor base is mounted on the first opening mechanism/the second opening mechanism.

The driving motor is connected with the controller through a control line.

Preferably, the first opening mechanism and the second opening mechanism are of a same structure.

The first opening mechanism/the second opening mechanism includes an open-close base, a linear guideway, a load bearing sliding block, an open-close motor, a driving gear, a driven gear, an open-close screw and a screw nut.

The linear guideway and the open-close screw are mounted above the open-close base and arranged along the left-right direction.

The load bearing sliding block is mounted on the linear guideway.

The open-close motor is mounted below the open-close base.

One end of the open-close motor is connected with the driving gear, and the driven gear is located above the driving gear and engaged with the driving gear.

The driven gear is mounted at one end of the open-close screw and the screw nut is mounted on the open-close screw.

The bottom of the first travel driving mechanism/the second travel driving mechanism is mounted on the load bearing sliding block and the screw nut.

The open-close motor is connected with the controller through a control line.

Preferably, the first flexible rotating mechanism and the second flexible rotating mechanism are of a same structure.

The first flexible rotating mechanism/the second flexible rotating mechanism includes a needle bearing, a bearing base, a polyester elastic block and a limiting strip.

A circular groove for receiving the needle bearing is arranged at the bottom of the first opening mechanism/the second opening mechanism.

An outer ring of the needle bearing protrudes into the circular groove and is fixedly connected with the first opening mechanism/the second opening mechanism.

An inner ring of the needle bearing is connected with the bearing base.

A hole that is on an inner side of the polyester elastic block is adapted to an outer contour of the bearing base.

The bearing base is connected with the polyester elastic block by an interference fit.

A groove for receiving a lower end of the limiting strip is arranged at a side of the polyester elastic block.

A limiting groove for receiving an upper end of the limiting strip is further arranged at the bottom of the first opening mechanism/the second opening mechanism.

The limiting groove is located exactly above the groove, and a width of the limiting groove is greater than a width of the limiting strip.

The lower end of the limiting strip protrudes into the groove, and the upper end of the limiting strip protrudes into the limiting groove.

Preferably, the clamping mechanism includes a clamping wheel, a clamping wheel base, an upper support base, a lower support base and the tension spring.

The clamping wheel is mounted at one end of the clamping wheel base and located below the first driving wheel.

The upper support base and the lower support base are both fixedly mounted.

At least one of the upper support base and the lower support base has a vertical circular side wall.

A circular connection base is at the other end of the clamping wheel base. The other end of the clamping wheel base is located between the upper support base and the lower support base and sleeved on the circular side wall, and may swing back and forth around the circular side wall.

Two tension springs are symmetrically mounted between the clamping wheel base and the upper support base, where one of the tension springs is used to apply an acting force of an inclined front direction to the clamping wheel base, and the other of the tension springs is used to apply an acting force of an inclined rear direction to the clamping wheel base.

Preferably, the first lifting mechanism/the second lifting mechanism are of a same structure.

The first lifting mechanism/the second lifting mechanism includes a cantilever outer pipe, a guiding block, a cantilever inner pipe and a lifting push rod.

The cantilever outer pipe is connected with the cantilever inner pipe through the guiding block.

The lifting push rod is connected with a bottom of the cantilever outer pipe through a lifting push rod base.

The lifting push rod is connected with the cantilever inner pipe and used to drive the cantilever inner pipe to move up and down.

The lifting push rod is connected with the controller through a control line.

Preferably, the patrol device includes a camera, an infrared detector and a wireless signal transceiver.

The camera and the infrared detector are connected with the wireless signal transceiver through a line respectively.

The present disclosure has the following advantages.

The climbing robot traveling along an overhead line in the present disclosure includes three cantilevers, a driving wheel is disposed on each cantilever, and three driving wheels may be hung on a line at the same time and the driving wheels provide protection in cooperation with the clamping wheel. When crossing an obstacle, the robot allows at least two cantilevers to be hung on the line at the same time to avoid falling off the lines due to swing, thereby ensuring operation stability. In addition, when crossing an obstacle such as an anti-vibration hammer, the robot in the present disclosure can directly hit away the obstacle by using the clamping mechanism without performing the step of crossing obstacle, thereby improving the obstacle-crossing efficiency. In addition, the robot in the present disclosure can clearly transmit information of the traveled line to a ground base station through a 4G network, ensuring quality of overhead line patrol work. Further, the robot may be remotely controlled and therefore the robot is widely applied to the overhead line patrol work. The robot in the present disclosure can travel along an overhead line of 10 kV to 500 kV stably, and may cross line devices such as an anti-vibration hammer and a suspension clamp mounted on the overhead line. The robot in the present disclosure performs automatic control well during traveling and obstacle-crossing, and has advantages such as short obstacle-crossing time, a high efficiency, a large climbing angle, a firm structure, a light weight, a simple operation and a good real-time performance.

Figure 1:
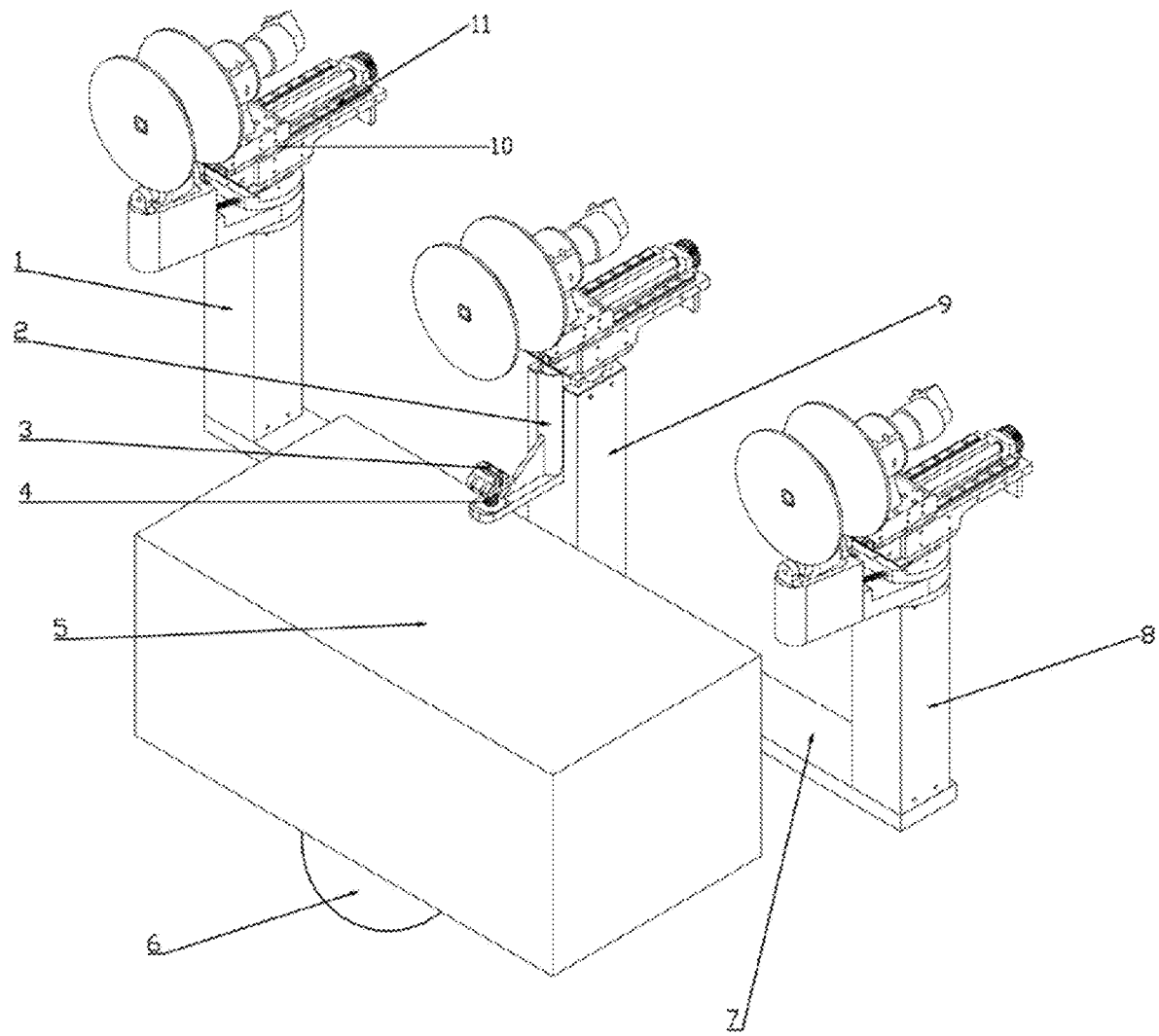
FIG. 1 is a schematic diagram illustrating a structure of a climbing robot traveling along an overhead line according to an example of the present disclosure.

In the drawings, 1 is a front cantilever; 2 is a charging base; 3 is a charging plug; 4 is a compression spring; 5 is a support structure; 6 is patrol device; 7 is a cantilever base; 8 is a rear cantilever; 9 is a middle cantilever; 10 is a load bearing sliding block; 11 is a linear guideway; 12 is a driving wheel; 13 is a shaft sleeve; 14 is a ball bearing; 15 is a steel sleeve; 16 is a needle bearing; 17 is a clamping wheel; 18 is a clamping wheel base; 19 is a tension spring; 20 is an upper support base; 21 is a lower support base; 22 is a cantilever outer pipe; 23 is a lifting push rod base; 24 is a lifting push rod; 25 is a cantilever inner pipe; 26 is a bearing base; 27 is a polyester elastic block; 28 is a limiting strip; 29 is a needle bearing; 30 is an open-close motor; 31 is a driving gear; 32 is an open-close base; 33 is a driven gear; 34 is an open-close screw; 35 is a screw nut; 36 is a driving motor; 37 is a motor base; 38 is a guiding block; 39 and 40 are mounting holes; 41 is an upper segment; 42 is a middle segment; 43 is a lower segment; 44 is a circular groove; 45 is a limiting groove.

DETAILED DESCRIPTION OF THE EMBODIMENTS

The present disclosure will be further described in detail below in combination with accompanying drawings and specific examples.

Figure 2:
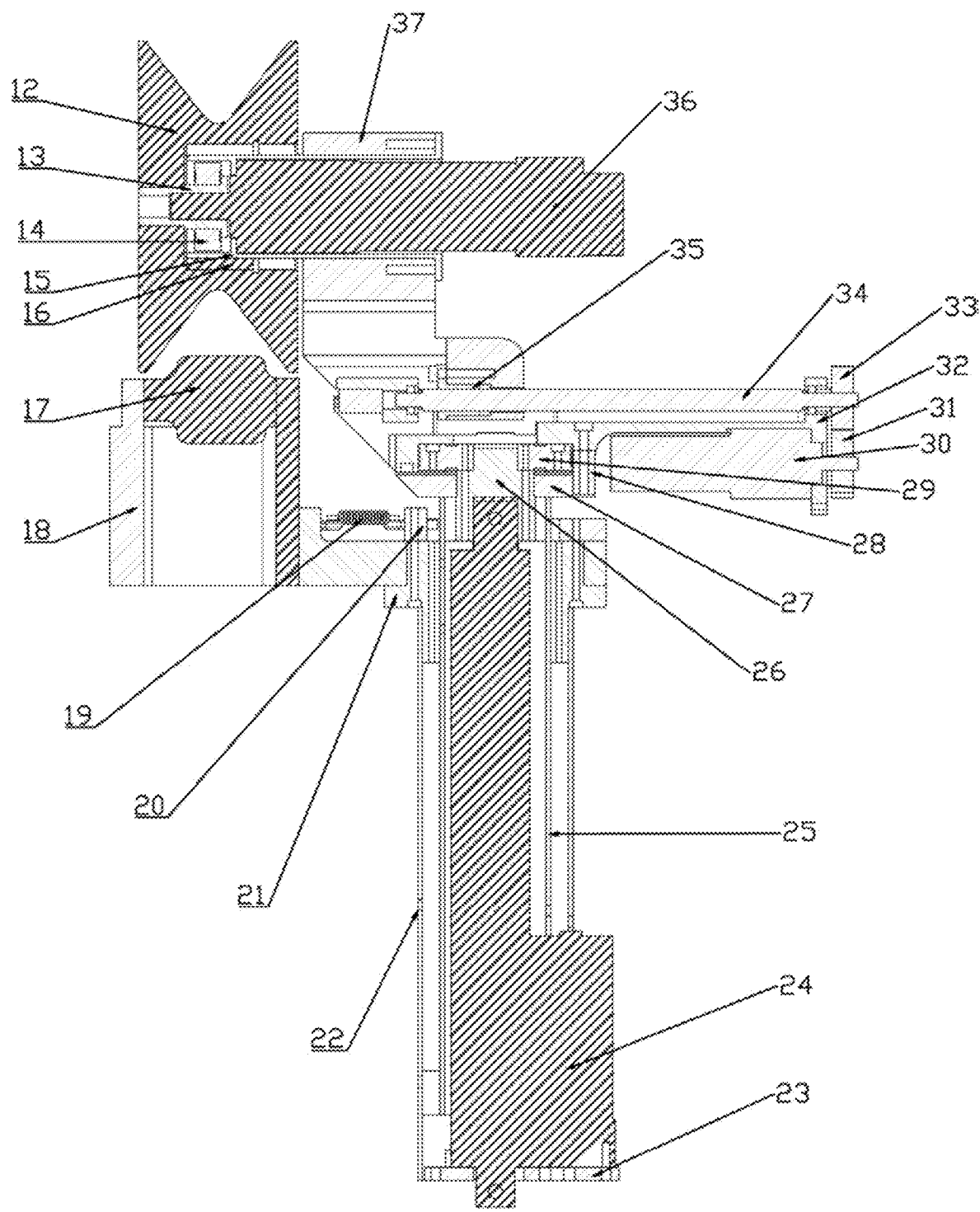
FIG. 2 is a sectional view illustrating a climbing robot traveling along an overhead line according to an example of the present disclosure.

As shown in FIG. 1 and FIG. 2, a climbing robot traveling along an overhead line includes a support structure 5, a cantilever base 7 and three cantilevers.

The support structure 5 in an example may be, for example, of a box structure.

A controller (not shown) is disposed in the support structure 5 and used to realize automatic control for other mechanisms.

In addition, the support structure 5 may also be disposed with a patrol device 6, such as a camera, an infrared detector and a wireless signal transceiver. The camera and the infrared detector are connected with the wireless signal transceiver through a line respectively.

The wireless signal transceiver is connected to a ground base station control center through wireless signals.

Preferably, the patrol device 6 in the example is mounted exactly below the support structure 5.

The patrol device 6 transmits image information of a photographed line to a ground base station control center through a wireless network bridge, so that ground personnel may determine a damage position of a transmission line and its surrounding environment to facilitate repair.

The cantilever base 7 is connected to a side of the support structure 5, for example, to a right side of the support structure 5 in FIG. 1 (of course, the cantilever base 7 may also be connected to a left side of the support structure 5 in FIG. 1). The cantilever base 7 is arranged in a front-rear direction and used to mount the cantilevers.

Preferably, the cantilever base 7 is a rectangular mounting plate.

The cantilevers are sequentially mounted on the cantilever base 7 along the front-rear direction.

As shown in FIG. 1, three cantilevers are provided, which are a front cantilever 1, a middle cantilever 9 and a rear cantilever 8 from front to rear. The structures of the front cantilever 1 and the rear cantilever 8 are completely same.

Compared with the other two cantilevers, the middle cantilever 9 lacks the after-mentioned clamping mechanism because the middle cantilever needs to be hung on a line separately and mounted with a charging mechanism. In addition, other structures of the middle cantilever 9 are completely same as the structures of the front cantilever 1 and the rear cantilever 8, which will be described in detail below.

Descriptions are made with the front cantilever l as an example.

The front cantilever 1 includes a driving wheel 12, a travel driving mechanism, an opening mechanism, a clamping mechanism, a flexible rotating mechanism and a lifting mechanism. When the robot travels or crosses an obstacle, the driving wheel 12 is hung on an overhead line for traveling.

The travel driving mechanism is used to drive the driving wheel 12 to travel.

Figure 3:
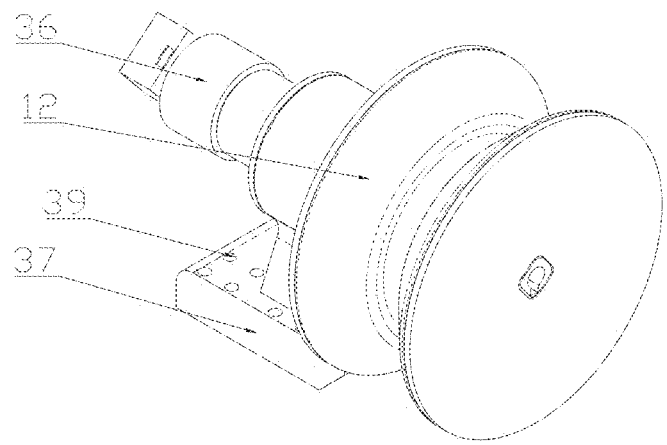
FIG. 3 is a schematic diagram illustrating a structure of a travel driving mechanism according to an example of the present disclosure.
Figure 4:
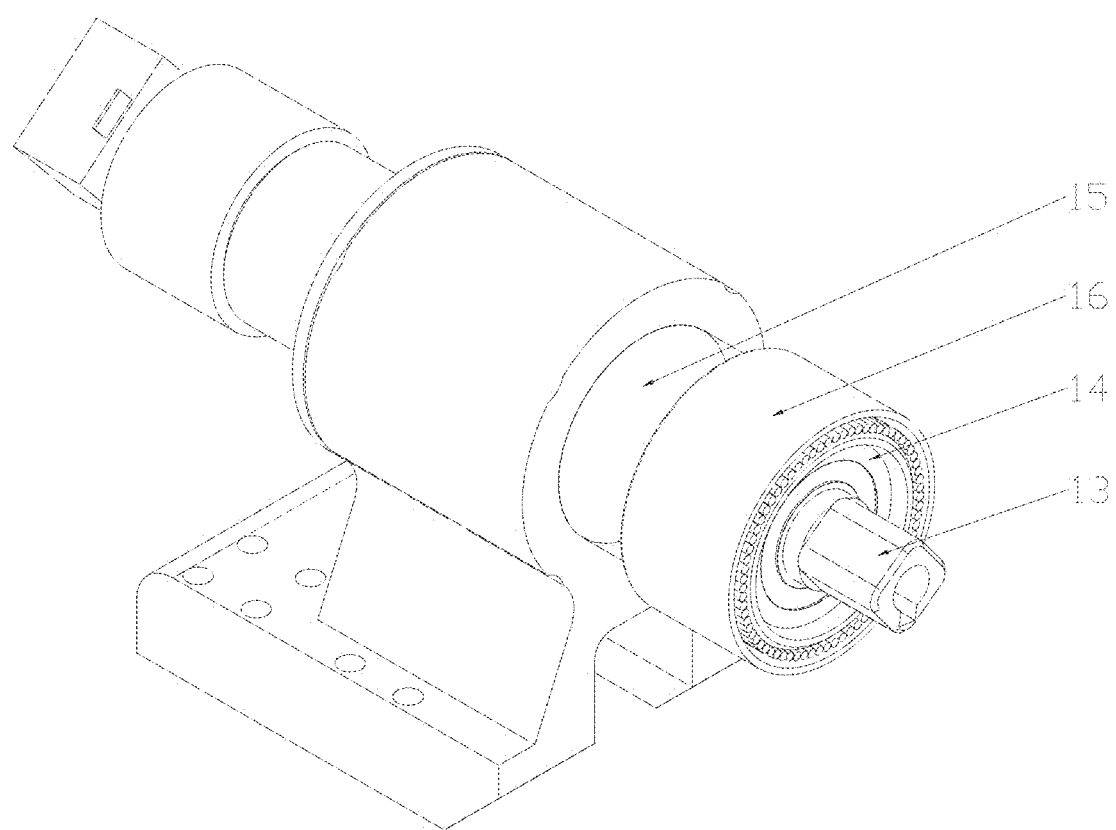
FIG. 4 is a schematic diagram illustrating a structure of a travel driving mechanism according to an example of the present disclosure (a driving wheel is not shown).

Specifically, as shown in FIGS. 2-4, the travel driving mechanism includes a driving motor 36, a shaft sleeve 13, a ball bearing 14, a steel sleeve 15, a needle bearing 16 and a motor base 37, and the like.

The driving motor 36 is connected with the driving wheel 12 through the shaft sleeve 13, and may drive the driving wheel 12 to rotate.

The driving motor 36 is mounted on the motor base 37.

In addition, a mounting hole 39 is further arranged on the motor base 37 and used to connect with the opening mechanism (which will be described in detail below).

The driving motor 36 in the example is connected with the controller through a control line, so that the controller controls an action.

The opening mechanism is used to drive the driving wheel 12 and the travel driving mechanism to move along a left-right direction in FIG. 1, thereby realizing opening and closing actions of the driving wheel 12 and completing an obstacle-crossing process.

Figure 5:
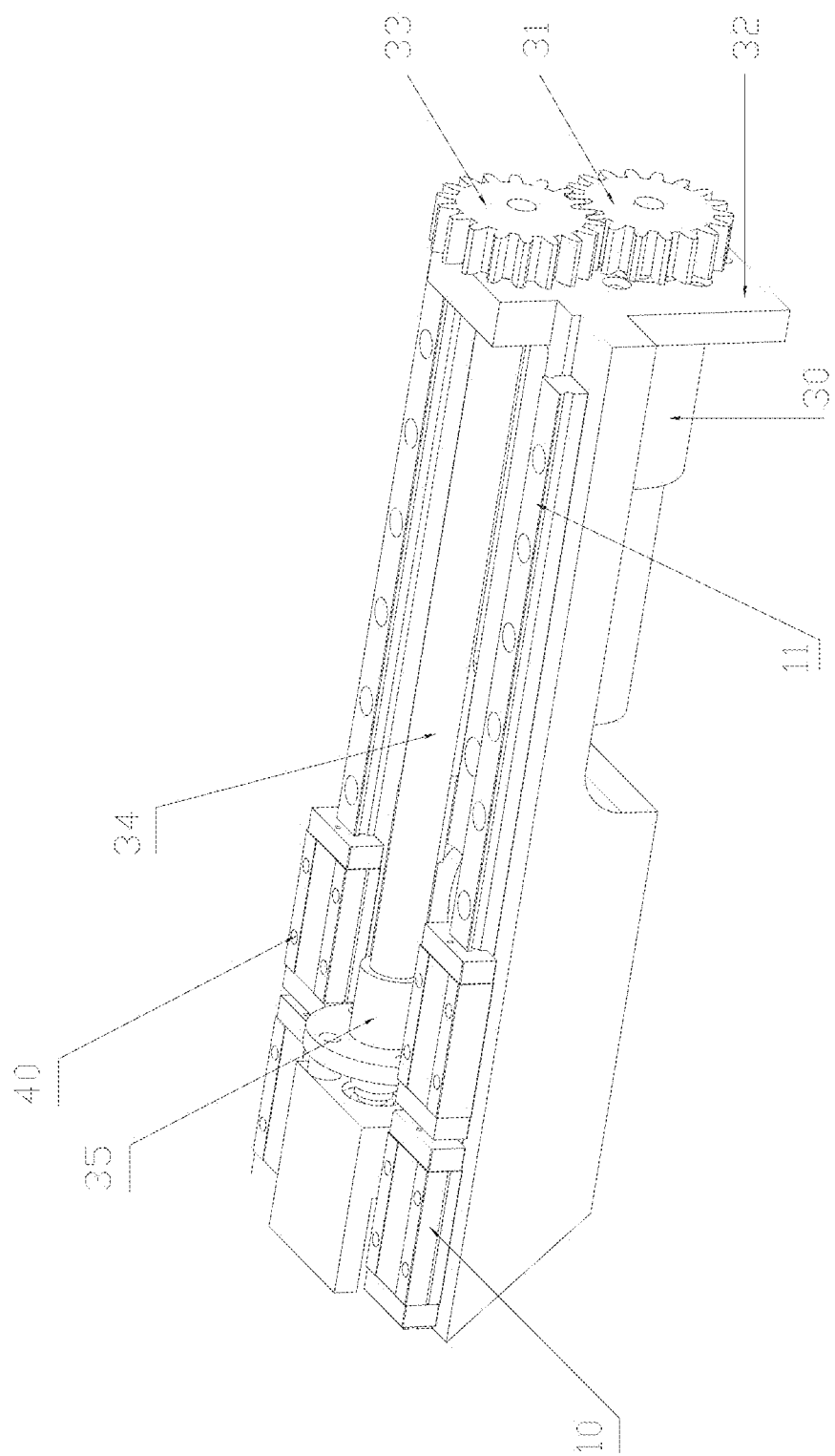
FIG. 5 is a schematic diagram illustrating a structure of an opening mechanism according to an example of the present disclosure.

Specifically, as shown in FIG. 5, the opening mechanism includes an open-close base 32, a linear guideway 11, a load bearing sliding block 10, an open-close motor 30, a driving gear 31, a driven gear 33, an open-close screw 34 and a screw nut 35.

The linear guideway 11 and the open-close screw 34 are mounted above the open-close base 32 and arranged along the left-right direction.

There are two linear guideways 11 in the example, and two load bearing sliding blocks 10 are disposed on each linear guideway 11 respectively.

The load bearing sliding block 10 may slide reciprocally along the linear guideway 11.

A mounting hole 40 is opened on each load bearing sliding block 10. Since the mounting hole 39 is opened on the motor base 37, the control of the motor base 37 and the load bearing sliding block 10 may be realized by a bolt penetrating through the mounting hole 39 and the mounting hole 40.

The open-close motor 30 is mounted below the open-close base 32. One end of the open-close motor 30 is connected with the driving gear 31, and the driven gear 33 is located above the driving gear 31 and engaged with the driving gear 31.

The driven gear 33 is mounted at an end of the open-close screw 34. The screw nut 35 is mounted on the open-close screw 34. The screw nut 35 may slide along the open-close screw 34. In addition, the screw nut 35 is connected with the motor base 37 through a bolt.

The open-close motor 30 is connected with the controller through a control line, so that the controller controls actions of the open-close motor 30.

An action principle of the opening mechanism will be described in detail below.

Under the control of the controller, the open-close motor 30 acts to drive the driving gear 31 to rotate and further drive the driven gear 33 to rotate, so that the screw nut 35 moves left and right along the open-close screw 34. Since the screw nut 35 is connected with the motor base 37, the driving wheel 12 and the travel driving mechanism may be driven to move left and right.

When the open-close motor 30 drives the driving wheel 12 and the travel driving mechanism to move rightward, an opening action of the driving wheel 12 is realized; when the open-close motor 30 drives the driving wheel 12 and the travel driving mechanism to move leftward, a closing action of the driving wheel 12 is realized.

The flexible rotating mechanism is located below the opening mechanism, and connected with the opening mechanism.

The flexible rotating mechanism is used to drive a corresponding opening mechanism to rotate at a particular angle in a horizontal direction, so that each cantilever has a particular rotation angle, thereby crossing a bridge and more obstacles.

Figure 6:
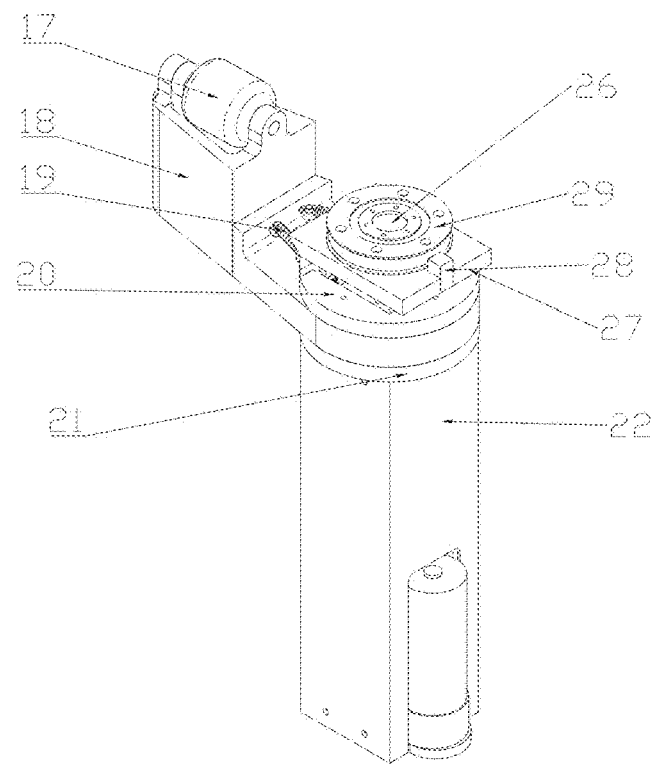
FIG. 6 is a schematic diagram illustrating an assembly structure of a lifting mechanism, a flexible rotating mechanism and a clamping mechanism according to an example of the present disclosure.
Figure 10:
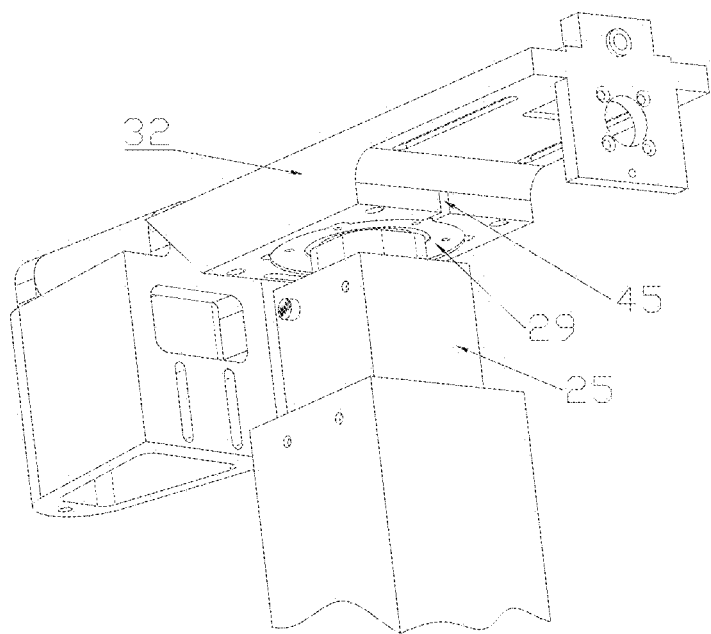
FIG. 10 is a schematic diagram illustrating an assembly of an open-close base and a needle bearing according to an example of the present disclosure.
Figure 11:
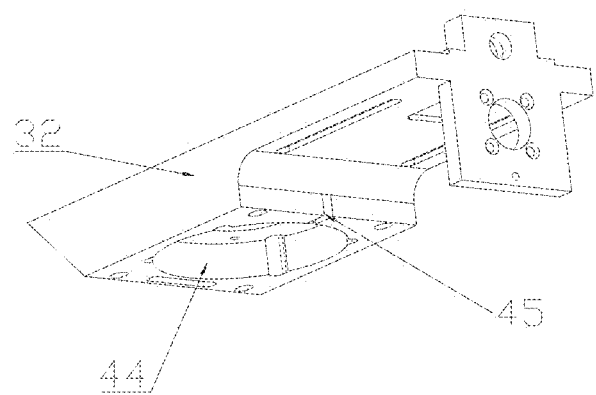
FIG. 11 is a schematic diagram illustrating a structure of an open-close base according to an example of the present disclosure.

As shown in FIG. 6, the flexible rotating mechanism includes a needle bearing 29, a bearing base 26, a polyester elastic block 27 and a limiting strip 28. As shown in FIG. 10 and FIG. 11, an outer ring of the needle bearing 29 is connected with the open-close base 32.

Specifically, a circular groove 44 for receiving the needle bearing 29 is arranged at a lower part of a front side of the open-close base 32, and the outer ring of the needle bearing 29 protrudes into the circular groove 44 and is fixed. The above fixed connection manner may be, for example, a bolt connection and so on.

An inner ring of the needle bearing 29 is connected with the bearing base 26 through a bolt.

In addition, a hole that is on an inner side of the polyester elastic block 27 is adapted to an outer contour of the bearing base 26. For example, if the outer contour of the bearing base 26 is square, a square hole is opened at the inner side of the polyester elastic block 27.

The above design facilitates performing an interference fit of the polyester elastic block 27 and the bearing base 26.

In addition, a groove (not shown) for receiving the limiting strip 28 is arranged at a side, for example, at a rear side, of the polyester elastic block 27. For example, the groove is square, and the limiting strip 28 may also be in an elongated shape. A lower end of the limiting strip 28 protrudes into the above groove.

As shown in FIG. 11, a limiting groove 45 is further arranged on the open-close base, and the limiting groove 45 is located at a rear side of the circular groove 44.

The above limiting groove 45 may be designed as a square. An upper end of the limiting strip 28 protrudes into the limiting groove 45.

The limiting groove 45 is located exactly above the groove. In the example, A width of the limiting strip 28 is less than a width of the limiting groove 45 to ensure that the open-close base 32 has a small-amplitude wing under the action of the outer ring of the needle bearing 29.

It is to be noted that the movement of the needle bearing 29 in the example is a passive movement, that is, the needle bearing 29 may rotate under the action of external obstacle, thereby driving the open-close base 32 to perform a quantity of movement at a particular angle in a horizontal direction.

At least one of the upper end and the lower end of the limiting strip 28 in the example needs to be fixed, for example, by a bolt.

The flexible rotating mechanism enables each cantilever to have a particular rotation angle, so as to cross a bridge, and even more obstacles. The design of the limiting strip 28 and the limiting groove 45 allows the open-close base 32 to have only a swing of a small range.

Figure 7:
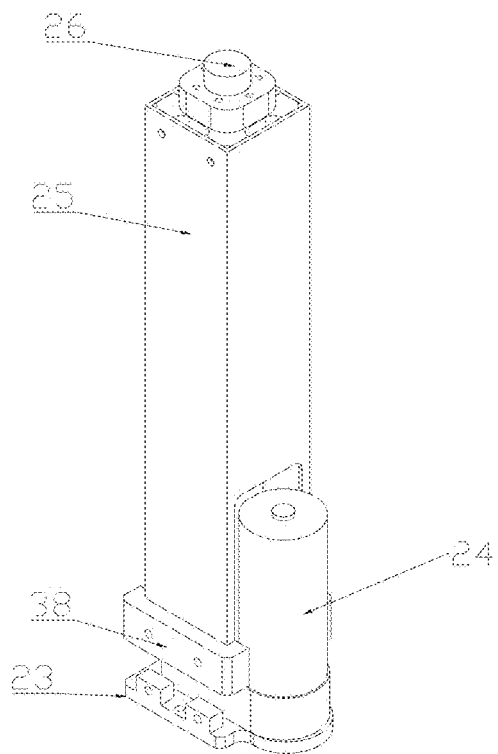
FIG. 7 is a schematic diagram illustrating an internal structure of a lifting mechanism according to an example of the present disclosure.

The bearing base 26 may be, for example, fixed on the after-mentioned cantilever inner pipe 25, as shown in FIG. 7.

The clamping mechanism in the example is located below the driving wheel 12, and configured to limit an overhead line to be within a wheel groove of the driving wheel 12, thereby ensuring operation stability of each cantilever on the overhead line. As shown in FIG. 6, the clamping mechanism includes a clamping wheel 17, a clamping wheel base 18, a tension spring 19, an upper support base 20 and a lower support base 21.

The clamping wheel 17 is mounted at an end of the clamping wheel base 18, and located below the driving wheel 12.

Under the action of the clamping wheel 17, the overhead line is located within the wheel groove of the driving wheel 12, ensuring traveling stability of the robot.

The upper support base 20 and the lower support base 21 in the example are both fixedly mounted.

Figure 8:
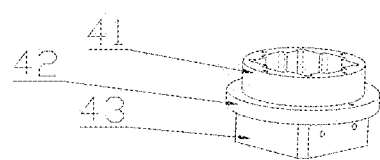
FIG. 8 is a schematic diagram illustrating a structure of a lower support base according to an example of the present disclosure.

As shown in FIG. 8, the lower support base 21 in the example is formed by connecting an upper segment 41, a middle segment 42 and a lower segment 43 sequentially.

An outer contour of the upper segment 41 is circular; an outer contour of the middle segment 42 is circular, that is, has a vertical circular side wall; an outer contour of the lower segment 43 is square. A sectional size of the middle segment 42 is greater than sectional sizes of the upper segment 41 and the lower segment 43.

A through hole (not shown) for the below cantilever inner pipe 25 to penetrate through upwards is arranged at an inner side of the lower support base 21.

The lower segment 43 of the lower support base 21 protrudes into the aftermentioned cantilever outer pipe 22, and is fixed by a bolt. The cantilever inner pipe 25 may penetrate through the lower support base 21 upwards via the above through hole, as shown in FIG. 2.

After mounting, the middle segment 42 is placed at the top of the cantilever outer pipe 22. The upper support base 21 is also circular, and a lower surface of the upper support base 21 is connected with an upper surface of the lower support base 21 (the upper segment 41) by a bolt.

Figure 9:
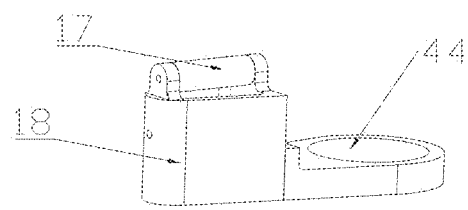
FIG. 9 is a schematic diagram illustrating a structure of a clamping wheel base according to an example of the present disclosure.

As shown in FIG. 9, a circular connection base 44 (i.e., a connection base having a circular hole) is at the other end of the clamping wheel base 18. The other end of the clamping wheel base 18 is located between the upper support base 20 and the lower support base 21 and sleeved on the middle segment 42.

When encountering an obstacle, the clamping mechanism may swing back and forth around the middle segment 42 (an axis).

In addition, two tension springs 19 are symmetrically mounted between the clamping wheel base 18 and the upper support base.

One of the tension springs 19 is used to apply an acting force of an inclined front direction to the clamping wheel base 18, and the other of the tension springs 19 is used to apply an acting force of an inclined rear direction to the clamping wheel base 18. The relatively balanced acting forces of the two tension springs 19 may keep the clamping wheel 17 located exactly below the driving wheel 12. When crossing an obstacle, the clamping mechanism may generate a forward or backward swing.

Under the actions of two tension springs 19, the clamping wheel can be automatically returned after deviating from under the driving wheel 12.

The lifting mechanism is located below the flexible rotating mechanism and used to drive other different mechanisms to perform ascending and descending actions.

For the front cantilever 1 and the rear cantilever 8, the lifting mechanism may drive the driving wheel, the travel driving mechanism, the opening mechanism, the clamping mechanism and the flexible rotating mechanism to realize the ascending and descending actions synchronously. For the middle cantilever 9, the lifting mechanism may drive the driving wheel, the travel driving mechanism, the opening mechanism and the flexible rotating mechanism to realize the ascending and descending actions synchronously.

As shown in FIG. 6 and FIG. 7, the lifting mechanism includes a cantilever outer pipe 22, a guiding block 38, a cantilever inner pipe 25 and a lifting push rod 24; the cantilever outer pipe 22 is connected with the cantilever inner pipe 25 through the guiding block 38.

The lifting push rod 24 is connected with the cantilever inner pipe 25 and used to drive the cantilever inner pipe 25 to move up and down. During a movement, the guiding block 38 may ensure the moving direction of the cantilever inner pipe 25 within the cantilever outer pipe 22.

The lifting push rod 24 is connected with a bottom of the cantilever outer pipe 22 through a lifting push rod base 23.

The lifting push rod 24 is connected with the controller through a control line, controlled by the controller.

As described above, the middle cantilever 9 has the same driving wheel, travel driving mechanism, opening mechanism, flexible rotating mechanism and lifting mechanism as the front cantilever 1 and the rear cantilever 8.

In addition, the middle cantilever 9 further includes a charging mechanism (located at a left side of the middle cantilever).

The charging mechanism includes a charging plug 3, the charging plug 3 is connected with a charging base 2 through a compression spring 4, and the charging base 2 is connected with the cantilever inner pipe 25 through a bolt. The charging plug 3 is connected with the controller through a line.

In the climbing robot traveling along an overhead line in an example, three cantilevers travels on a transmission line through the travel driving mechanism; the robot performs ascending and descending actions, i.e. extension and retraction states, in a vertical direction through the lifting mechanism.; the travel driving mechanism performs opening and closing actions, i.e. opening and closing states, through the opening mechanism.

Based on the above structure, three cantilevers in the example may perform extension and retraction actions and opening and closing actions sequentially by cooperation to cross the obstacle.

A working process of the climbing robot traveling along an overhead line in the example will be described in detail below.

Crossing a suspension clamp is taken as an example. When the robot travels on a transmission line, the front cantilever 1, the middle cantilever 9 and the rear cantilever 8 are hung on a line through the driving wheel 12, and the lifting mechanisms of the front cantilever 1, the middle cantilever 9, the rear cantilever 8 are in a retraction state, the opening mechanisms are in a closed state, and the clamping mechanisms are in a clamping state. When encountering an obstacle, for example, the suspension clamp, the robot stops traveling, lifts the front cantilever 1 through the lifting mechanism, opens the driving wheel 12 of the front cantilever 1 through the opening mechanism, lowers the front cantilever 1 through the lifting mechanism, travels forward, and then, lifts the front cantilever 1 through the lifting mechanism, closes the front cantilever 1 through the opening mechanism, lowers the front cantilever 1 through the lifting mechanism, and travels forward; the robot lifts the middle cantilever 9 through the lifting mechanism, opens the driving wheel 12 of the middle cantilever 9 through the opening mechanism, lowers the middle cantilever 9 through the lifting mechanism, travels forward, and then, lifts the middle cantilever 9 through the lifting mechanism, closes the middle cantilever 9 through the opening mechanism, lowers the middle cantilever 9 through the lifting mechanism, and travels forward; the robot lifts the rear cantilever 8 through the lifting mechanism, opens the driving wheel 12 of the rear cantilever 8 through the opening mechanism, lowers the rear cantilever 8 through the lifting mechanism, travels forward, and then, lifts the rear cantilever 8 through the lifting mechanism, closes the rear cantilever 8 through the opening mechanism, lowers the rear cantilever 8 through the lifting mechanism, and travels forward. In this way, obstacle crossing is completed. When encountering an obstacle, for example, an anti-vibration hammer, since the clamping mechanisms of the front and rear cantilevers may directly hit away the obstacle, the robot can directly travel forward without crossing the obstacle.

Of course, the above descriptions are merely preferred examples of the present disclosure but the present disclosure is not limited to these examples. It is to be noted that any equivalent substitutions and obvious variations made by those skilled in the art under the teaching of the specification of the present disclosure should fall in the scope of essence of the specification of the present disclosure, and should be protected by the present disclosure.

The invention claimed is:

1. A climbing robot traveling along an overhead line, comprising a support structure mounted with a patrol device, wherein:
   the climbing robot traveling along an overhead line further comprises:
   a cantilever base connected to a side of the support structure, and
   a front cantilever, a middle cantilever and a rear cantilever sequentially mounted on the cantilever base along a front-rear direction;

wherein the front cantilever and the rear cantilever are of a same structure; the front cantilever/the rear cantilever comprises a first driving wheel, a first travel driving mechanism, a first opening mechanism, a clamping mechanism, a first flexible rotating mechanism and a first lifting mechanism;

the first travel driving mechanism is connected with the first driving wheel and drives the first driving wheel to rotate;

a bottom of the first travel driving mechanism is mounted on the first opening mechanism used to drive the first driving wheel and the first travel driving mechanism to move along a left-right direction synchronously so as to realize opening and closing actions of the first driving wheel;

the clamping mechanism is located below the first driving wheel and configured to limit an overhead line to be within a wheel groove of the first driving wheel; the clamping mechanism is configured with a tension spring for automatically returning the clamping mechanism deviating from under the first driving wheel;

the first flexible rotating mechanism is located below the first opening mechanism and connected with the first opening mechanism; the first flexible rotating mechanism is configured to drive the first opening mechanism to rotate at a particular angle in a horizontal direction;

the first lifting mechanism is located below the first flexible rotating mechanism and used to drive the first driving wheel, the first travel driving mechanism, the first opening mechanism and the first flexible rotating mechanism to perform ascending and descending actions synchronously;

the middle cantilever comprises a second driving wheel, a second traveling driving mechanism, a second opening mechanism, a second flexible rotating mechanism and a second lifting mechanism; the second travel driving mechanism is connected with the second driving wheel and drives the second driving wheel to rotate;

a bottom of the second travel driving mechanism is mounted on the second opening mechanism used to drive the second driving wheel and the second travel driving mechanism to move along a left-right direction synchronously so as to realize opening and closing actions of the second driving wheel;

the second flexible rotating mechanism is located below the second opening mechanism and connected with the second opening mechanism; the second flexible rotating mechanism is configured to drive the second opening mechanism to rotate at a particular angle in a horizontal direction;

the second lifting mechanism is located below the second flexible rotating mechanism and used to drive the second driving wheel, the second travel driving mechanism, the second opening mechanism and the second flexible rotating mechanism to perform ascending and descending actions synchronously; and a controller is arranged in the support structure, wherein the controller is connected with the first travel driving mechanism, the second travel driving mechanism, the first opening mechanism, the second opening mechanism, the first lifting mechanism and the second lifting mechanism respectively;

the first opening mechanism and the second opening mechanism are of a same structure;

the first opening mechanism/the second opening mechanism comprises an open-close base, a linear guideway, a load bearing sliding block, an open-close motor, a driving gear, a driven gear, an open-close screw and a screw nut;

wherein the linear guideway and the open-close screw are mounted above the open-close base and arranged along the left-right direction;

the load bearing sliding block is mounted on the linear guideway;

the open-close motor is mounted below the open-close base;

one end of the open-close motor is connected with the driving gear, and the driven gear is located above the driving gear and engaged with the driving gear;

the driven gear is mounted at one end of the open-close screw;

the screw nut is mounted on the open-close screw;

the bottom of the first travel driving mechanism/the second travel driving mechanism is mounted on the load bearing sliding block and the screw nut; and the open-close motor is connected with the controller through a control line.

2. The climbing robot traveling along an overhead line according to claim 1, wherein, the first travel driving mechanism and the second travel driving mechanism are of a same structure;

the first travel driving mechanism/the second travel driving mechanism comprises a driving motor, a shaft sleeve and a motor base, wherein the driving motor is connected with the first driving wheel/the second driving wheel through the shaft sleeve, and mounted on the motor base;

the motor base is mounted on the first opening mechanism/the second opening mechanism; and the driving motor is connected with the controller through a control line.

3. The climbing robot traveling along an overhead line according to claim 1, wherein, the first flexible rotating mechanism and the second flexible rotating mechanism are of a same structure;

the first flexible rotating mechanism/the second flexible rotating mechanism comprises a needle bearing, a bearing base, a polyester elastic block and a limiting strip;

a circular groove for receiving the needle bearing is arranged at a bottom of the first opening mechanism/the second opening mechanism;

an outer ring of the needle bearing protrudes into the circular groove and is fixedly connected with the first opening mechanism/the second opening mechanism;

an inner ring of the needle bearing is connected with the bearing base;

a hole at an inner side of the polyester elastic block is adapted to an outer contour of the bearing base;

the bearing base is connected with the polyester elastic block by an interference fit;

a groove for receiving a lower end of the limiting strip is arranged at a side of the polyester elastic block;

a limiting groove for receiving an upper end of the limiting strip is further arranged at the bottom of the first opening mechanism/the second opening mechanism;

the limiting groove is located exactly above the groove, and a width of the limiting groove is greater than a width of the limiting strip; and the lower end of the limiting strip protrudes into the groove, and the upper end of the limiting strip protrudes into the limiting groove.

4. The climbing robot traveling along an overhead line according to claim 1, wherein,
- the clamping mechanism comprises a clamping wheel, a clamping wheel base, an upper support base, a lower support base and the tension spring;
- wherein the clamping wheel is mounted at one end of the clamping wheel base and located below the first driving wheel;
- the upper support base and the lower support base are both fixedly mounted;
- at least one of the upper support base and the lower support base has a vertical circular side wall;
- a circular connection base is at the other end of the clamping wheel base; the other end of the clamping wheel base is located between the upper support base and the lower support base and sleeved on the circular side wall, and is capable of swinging back and forth around the circular side wall; and
- two tension springs are symmetrically mounted between the clamping wheel base and the upper support base, wherein one of the tension springs is used to apply an acting force of an inclined front direction to the clamping wheel base, and the other of the tension springs is used to apply an acting force of an inclined rear direction to the clamping wheel base.

5. The climbing robot traveling along an overhead line according to claim 1, wherein,
- the first lifting mechanism and the second lifting mechanism are of a same structure;
- the first lifting mechanism/the second lifting mechanism comprises a cantilever outer pipe, a guiding block, a cantilever inner pipe and a lifting push rod;
- wherein the cantilever outer pipe is connected with the cantilever inner pipe through the guiding block;
- the lifting push rod is connected with a bottom of the cantilever outer pipe through a lifting push rod base;
- the lifting push rod is connected with the cantilever inner pipe and used to drive the cantilever inner pipe to move up and down; and
- the lifting push rod is connected with the controller through a control line.

6. The climbing robot traveling along an overhead line according to claim 1, wherein
- the patrol device comprises a camera, an infrared detector and a wireless signal transceiver;
- wherein the camera and the infrared detector are connected with the wireless signal transceiver through a line respectively.

* * * * *